United States Patent [19]

Fergason et al.

[11] Patent Number: 5,016,982

[45] Date of Patent: May 21, 1991

[54] LIQUID CRYSTAL DISPLAY HAVING A CAPACITOR FOR OVERVOLTAGE PROTECTION

[75] Inventors: James L. Fergason, Atherton; Manoochehr Mohebban, Foster City, both of Calif.

[73] Assignee: Raychem Corporation, Menlo Park, Calif.

[21] Appl. No.: 437,326

[22] Filed: Nov. 17, 1989

Related U.S. Application Data

[63] Continuation of Ser. No. 176,522, Apr. 1, 1988, abandoned, which is a continuation-in-part of Ser. No. 889,046, Jul. 22, 1986, abandoned.

[51] Int. Cl.$^5$ .............................................. G02F 1/13
[52] U.S. Cl. ................................. 350/331 R; 350/334; 350/336
[58] Field of Search ............... 350/331 R, 332, 333, 350/334, 336, 339 R, 346; 340/365 C, 713, 784, 719; 361/56, 58, 91

[56] References Cited

U.S. PATENT DOCUMENTS

| | | | |
|---|---|---|---|
| 2,969,481 | 1/1961 | Sack, Jr. | 340/719 |
| 3,725,899 | 4/1973 | Greubel | 350/339 R |
| 3,889,158 | 6/1975 | Peterson | 361/56 |
| 3,979,743 | 9/1976 | Moore | 350/336 |
| 4,040,720 | 8/1977 | York | 350/339 R |
| 4,290,061 | 9/1981 | Serrano | 340/712 |
| 4,405,918 | 9/1983 | Wall et al. | 340/365 C |
| 4,435,047 | 3/1984 | Fergason | 350/334 |
| 4,456,939 | 6/1984 | Ozaki et al. | 361/56 |
| 4,523,189 | 6/1985 | Takahara et al. | 340/719 |
| 4,529,968 | 7/1985 | Hilsum et al. | 350/365 C |
| 4,580,063 | 4/1986 | Torelli et al. | 361/56 |
| 4,639,087 | 1/1987 | Cannella | 350/332 |
| 4,643,528 | 2/1987 | Bell, Jr. | 350/334 |

FOREIGN PATENT DOCUMENTS

| | | |
|---|---|---|
| 2949561 | 6/1981 | Fed. Rep. of Germany ...... 350/336 |
| 3219703A1 | 5/1982 | Fed. Rep. of Germany . |
| 3308972 | 9/1983 | Fed. Rep. of Germany . |
| 3403655A1 | 1/1984 | Fed. Rep. of Germany . |

Primary Examiner—Stanley D. Miller
Assistant Examiner—Tai V. Duong
Attorney, Agent, or Firm—Herbert G. Burkard; Yuan Chao

[57] ABSTRACT

A liquid crystal display (LCD) is connected in series with a capacitor having a capacitance $C_0$ such that $$C_1 < C_0 < C_2$$

where $C_1$ is the capacitance of the LCD at its threshold voltage and $C_2$ is the capacitance of the LCD at its saturation voltage.

12 Claims, 3 Drawing Sheets

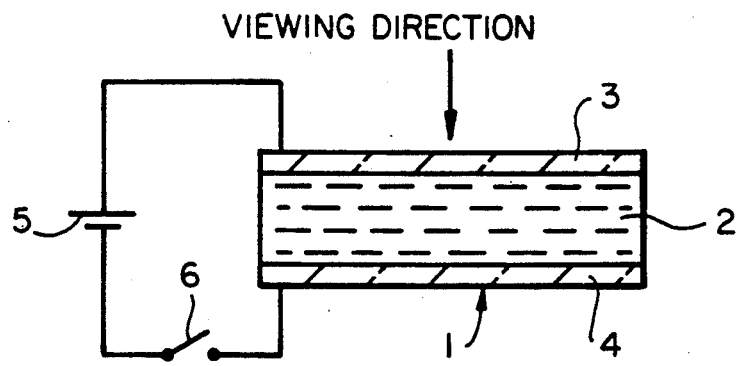
FIG_1A
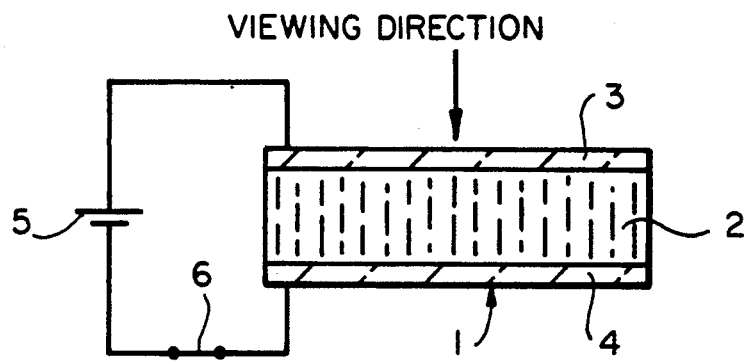
FIG_1B
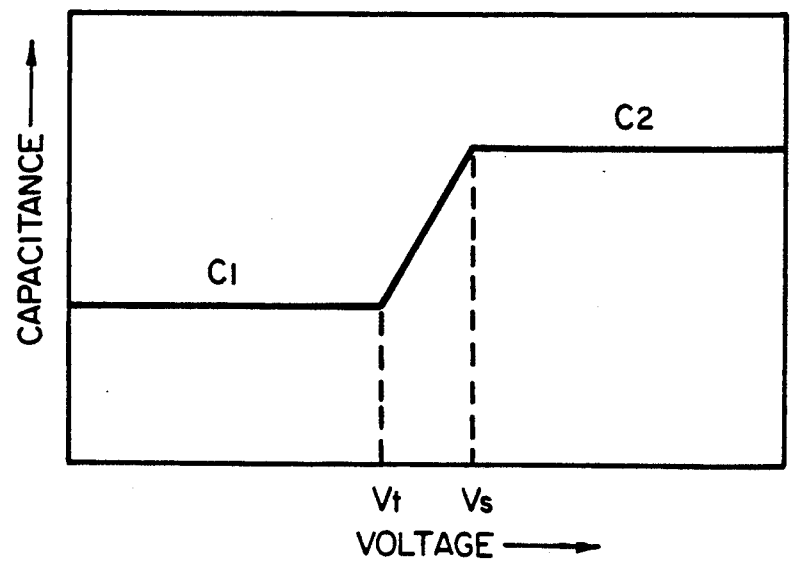
FIG_2

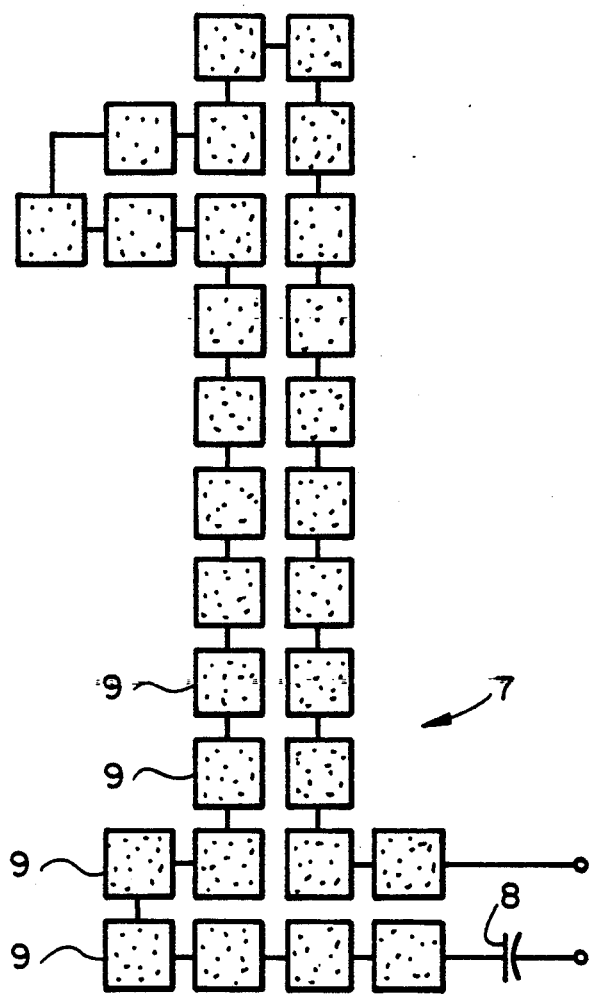
FIG_3
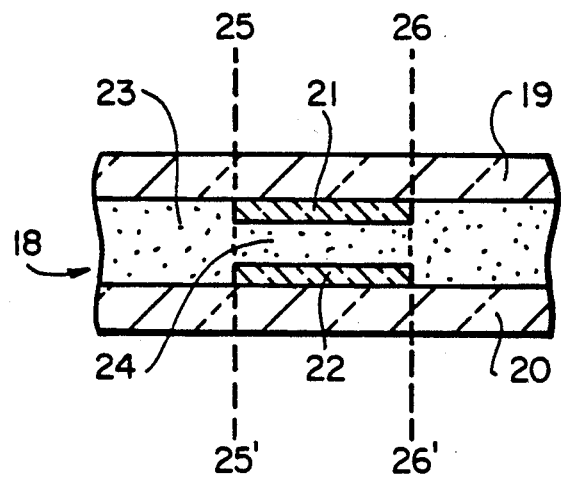
FIG_5

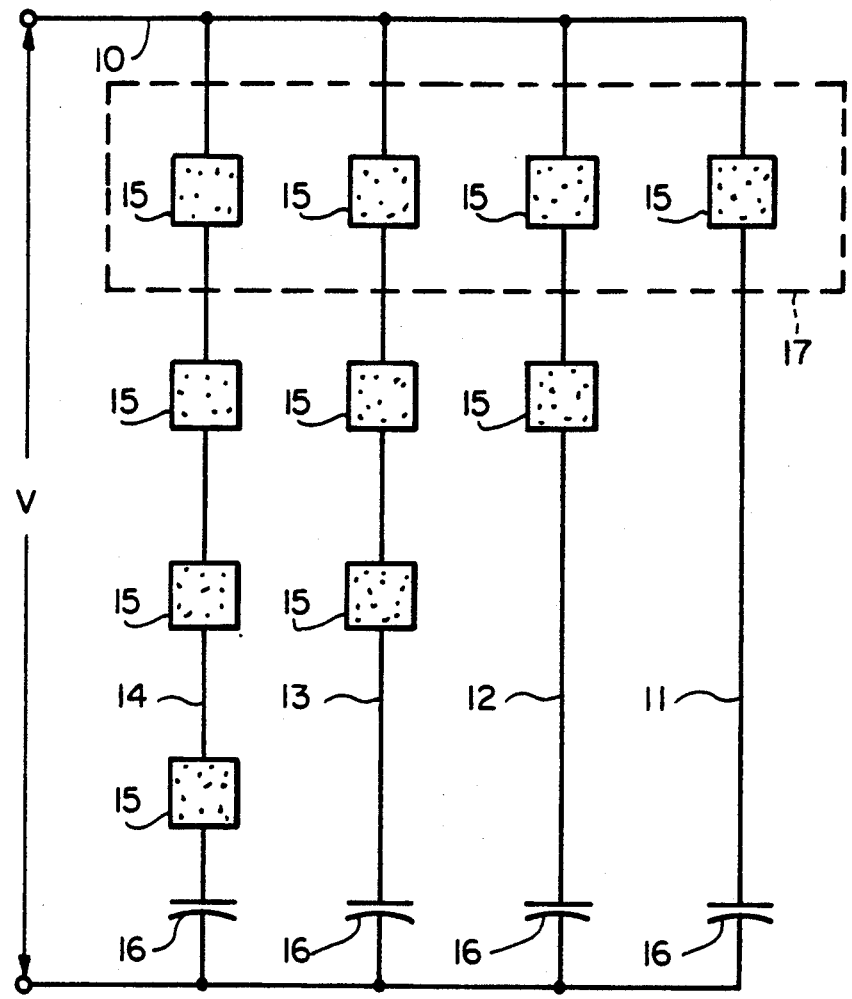
FIG_4
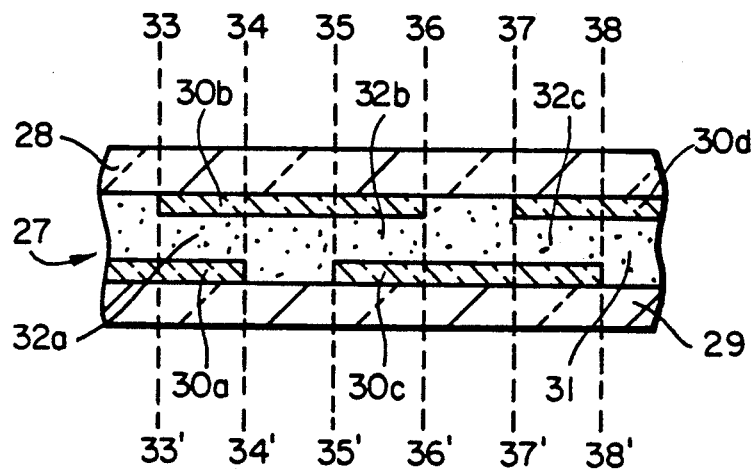
FIG_6

LIQUID CRYSTAL DISPLAY HAVING A CAPACITOR FOR OVERVOLTAGE PROTECTION

BACKGROUND OF THE INVENTION

This application is a continuation of application Ser. No. 176,552 now abandoned, which is a continuation-in-part of application Ser. No. 889,046 filed July 22, 1986, now abandoned, the entire disclosure of which is incorporated herein by reference.

This invention relates to a liquid crystal display and to a method of protecting a liquid crystal display against an overvoltage.

Liquid crystal displays (LCD's) are well known and have enjoyed a huge commercial success. They rely on the ability of liquid crystal materials to change their optical state (i.e., "turn on") in response to an applied voltage exceeding a threshold voltage, resulting in a readily observable change in the appearance of the display. For example, the display can appear to be opaque below the threshold voltage and transparent above it, or vice versa. Alternatively, the display can change color when the threshold voltage is exceeded. The preparation and use of LCD's is reviewed by Bahadur in *Mol. Cryst. Liq. Cryst.* 109, 3 (1984), the disclosure of which is incorporated herein by reference.

As the voltage across an LCD is increased, at a certain point it will exceed the dielectric withstand voltage of the liquid crystal or of some other material component of the display, resulting in the failure or destruction of the LCD. Hereinafter, this voltage will be referred to as the withstand voltage $V_w$ of an LCD and a voltage above the withstand voltage will be referred to as an overvoltage. For example, an LCD may be exposed to an overvoltage because it is accidentally connected directly to a system carrying a voltage above $V_w$ or because a system to which the LCD is intentionally connected experiences an unexpected power surge.

For certain applications of LCD's, such as battery operated watches, the LCD is used in low voltage circuits, i.e., circuits well below the withstand voltage. It has been proposed to use LCD's in situations where the available power supplies are at voltages substantially above the LCD's withstand voltage. DE No. 3,308,972-A1 (Heverhagen et al.) discloses a device for displaying the operating state of a fuse. An LCD with a series-connected capacitor is electrically connected across the fuse being monitored. Both connecting leads can be ohmically connected, or one can be capacitively coupled while the other is ohmically connected. In this way, the LCD is provided with the necessary minimum operating current for nearly power-free detection of mains voltages. DE No. 3,219,703-A1 (Kehr) discloses an electrical connector for medium and high voltage cables in which an LCD monitor on the connector gives a continuous read out of on/off state of the cable. The monitor is coupled via a voltage reduction circuit to the current carrying parts of the cable. The monitor is connected to the shield of the cable, which is grounded. DE No. 3,402,655-A1 (Goehlich) discloses a device for indicating the state of a high voltage installation. This device, which has an LCD display, is electrically connected to the installation by a single-pole connecting line and is capacitively coupled to ground.

SUMMARY OF THE INVENTION

This invention provides an electrical apparatus comprising (a) an LCD comprising a positive dielectric anisotropy liquid crystal and having a capacitance $C_1$ below its threshold voltage and a capacitance $C_2$ above its saturation voltage and (b) a capacitor connected in series with the liquid crystal display and having a capacitance $C_0$ satisfying the inequality $$C_0 < C_2.$$

Preferably, the capacitance $C_0$ is substantially constant. Also preferably, $C_0$ satisfies the inequality $$C_1 < C_0 < C_2.$$

Preferably, the liquid crystal is an encapsulated nematic liquid crystal.

In another embodiment of the invention, there is provided an electrical apparatus comprising (a) a series-connected array of LCD's as described immediately above, and (b) a capacitor having a capacitance $C_0$ and connected in series with an LCD at a terminus of the array, such that $$C_0 < C_2/n,$$

where n is the number of displays in the array and $C_2$ is as defined above.

In yet another embodiment of the invention, there is provided an electrical circuit comprising (a) an LCD as defined immediately above;

(b) a capacitor in series with the LCD; and (c) a means for applying a voltage less than the withstand voltage of the LCD across the combination of the LCD display and the capacitor.

Preferably the capacitor has a substantially constant capacitance, which capacitance is preferably less than $C_2$ and, more preferably, between $C_1$ and $C_2$, $C_1$ and $C_2$ being as previously defined. The circuit can comprise additional LCD's. The means can be a power source having an output voltage less than the withstand voltage of the LCD or can be a power supply having an output voltage greater than the withstand voltage of the LCD in combination with a voltage reduction means. The voltage reduction means can be a capacitor.

BREIF DESCRIPTION OF THE DRAWINGS

FIGS. 1a and 1b depict schematically how, in an LCD, an impressed voltage can cause liquid crystal molecules to realign.

FIG. 2 shows generally how the capacitance of an LCD made with a liquid crystal having positive dielectric anisotropy varies with applied voltage.

FIG. 3 shows an embodiment of this invention in which an array of LCD's are arranged to create a larger pattern.

FIG. 4 shows another embodiment of this invention, in which the LCD's function as the display element of an analog voltage display.

FIG. 5 shows a laminar LCD construction using encapsulated liquid crystals.

FIG. 6 shows a laminar construction using liquid crystals in which a plurality of LCD's are connected in series to form a series-connected array.

DETAILED DESCRIPTION OF THE INVENTION

A limitation in using a voltage reduction circuit to reduce the amount of a line voltage reaching an LCD is that, at the same time, the line voltage needed to turn on the LCD is increased substantially. Consider an LCD having, say, a threshold voltage of 10 volts and a withstand voltage of 200 volts. If it is connected to a voltage reduction circuit such that the line voltage to it is halved, then the LCD will be subjected to the threshold voltage only when the line voltage is at least 20 volts. That is, the effective threshold voltage has been doubled and the LCD is less sensitive than before. At the same time, the effective withstand voltage has been doubled—the LCD will not fail until the line voltage reaches 400 volts. If the voltage reduction circuit reduces the line voltage by only one-third, then the LCD will not be subjected to its threshold voltage until the line voltage is 15 volts—i.e., the effective threshold voltage has not been increased as much as in the previous case. But now the voltage across the LCD will reach 200 volts when the line voltage is only 300 volts—i.e., the level of overvoltage protection has been reduced. Consequently, there is a trade-off between the effective threshold voltage and the amount of overvoltage protection, and it is desirable to maximize overvoltage protection while minimizing the resultant increase in the effective threshold voltage.

An LCD comprises a liquid crystal material between two overlapping electrodes, which are usually transparent, and behaves as a parallel-plate capacitor, in which the electrodes are the plates and the liquid crystal material in between is the dielectric. Thus an LCD has a capacitance $C_L$ given by:

$$C_L = k e_L A/d \quad (1)$$

where k is a constant, $e_L$ is the dielectric constant of the liquid crystal material, A is the area of overlap between the electrodes, and d is the thickness of the liquid crystal layer.

When another capacitor with a capacitance $C_0$ is connected in series with the LCD, this is circuit-wise equivalent to having two capacitors in series. The total capacitance C is given by:

$$1/C = 1/C_0 + 1/C_L \quad (2)$$

When this two-element combination is connected across a voltage V, V is distributed across across the individual elements according to equation (3):

$$V = V_0 + V_L \quad (3)$$

where $V_0$ is the voltage across the capacitor $C_0$ and $V_L$ is the voltage across the LCD.

Furthermore, since the charge Q stored across the capacitor and the LCD are the same, we have, from the well known relationship between charge, capacitance, and voltage, $$Q = C_0 V_0 = C_L V_L \quad (4)$$

Combining equations (2), (3), and (4), we have $$V_L = C_0 V/(C_0 + C_L) = CV/C_L \quad (5)$$

From a knowledge of $C_L$, $C_0$, and V, the voltage across the LCD element can readily be calculated. It is also apparent from equation (5) that the smaller $C_0$ is relative to $C_L$, the smaller $V_L$ is as a fraction of the line voltage V and the greater the overvoltage protection.

In order to make an LCD easy to use, it is desirable to reduce the line voltage needed to make the voltage across the LCD reach the threshold voltage, or "turn on." As equation (5) shows, this is achieved by increasing $C_0$, thereby increasing the fraction of V that is distributed across the LCD.

In summary, before the LCD turns on, it is desirable to increase the fraction of line voltage V distributed across it, whereas after it has turned on, it is desirable to reduce that same fraction—seemingly inconsistent requirements. However, the present invention teaches how this can be accomplished, using certain special LCD's, i.e., those comprising a liquid crystal material having a positive dielectric anisotropy.

Liquid crystals typically are molecules having elongated shapes with a tendency to align or orient themselves with their long molecular axes parallel to each other. This alignment causes liquid crystals to be anisotropic, meaning that their physical, optical, and other properties are not the same when measured parallel to and perpendicular to the direction of alignment. The direction of alignment can be influenced rather easily by some external force, for example an applied voltage. FIGS. 1a and 1b show in a general fashion how LCD's utilize these traits. LCD 1 comprises a liquid crystal 2 between electrodes 3 and 4 and is connected across a voltage source 5. Switch 6 is open, so that the LCD 1 is in its "off" state. The liquid crystal 2 is depicted as having its long molecular axes oriented parallel to the plane of the electrodes, as would be true with LCD's of the "twisted nematic" type, although other orientations, including random orientation, are possible depending on the particular type and construction of the LCD. The voltage source 5 is depicted as being DC, although an AC source can be used.

In FIG. 1b, the same device and circuit are shown, but with switch 6 closed. The voltage impressed across the LCD 1 by voltage source 5 is sufficient to realign the molecules of crystal 2 with their long axes perpendicular to the plane of the electrodes 3 and 4. Because of its anisotropy, the liquid crystal 2 appears different when viewed perpendicular to (FIG. 1a) and parallel to (FIG. 1b) the long axis, so that an observer can readily determine if the LCD 1 is "off" or "on." For example, the liquid crystal 2 can appear opaque in the "off" state and transparent in the "on" state, or vice-versa.

A liquid crystal can also exhibit anisotropy in its dielectric constant. If so, the dielectric constant of a liquid crystal, which was represented generally in equation (1) by the symbol $e_L$, is more accurately represented by two values, $e_1$ and $e_2$, where $e_1$ is the value parallel to the long axis and $e_2$ is the value perpendicular to the long axis. Liquid crystals in which $e_2$ is greater than $e_1$ are said to have a positive dielectric anisotropy. Such liquid crystals include those typically used in twisted nematic LCD's. Suitable positive dielectric anisotropy liquid crystals include the liquid crystal known commercially as E7, supplied by British Drug House, and benzoate esters, particularly those having a 4-cyanophenyl moiety. Representative specific positive dielectric anisotropy liquid crystals are found in U.S. Pat. No. 4,591,233 (Fergason), the disclosure of which is herein incorporated by reference.

The effect of a positive dielectric anisotropy on the capacitance of an LCD is illustrated in FIG. 2, in which capacitance is plotted against the voltage. $V_t$ is the threshold voltage, meaning the voltage which is sufficient to begin causing realignment of the liquid crystal molecules and to effect a visually discernible change in the appearance of the LCD—that is, the voltage at which the LCD "turns on." $V_s$ is the saturation voltage, or the voltage at which the realignment process is complete. $C_1$ is the capacitance of the LCD at voltages below $V_t$, while $C_2$ is the capacitance at voltages above $V_s$. $C_1$ and $C_2$ can be calculated from equation (1) variants $$C_1 = k e_1 A/d \tag{6}$$

and $$C_2 = k e_2 A/d \tag{7}$$

where k, $e_1$, $e_2$, A, and d are as hereinbefore defined. It is evident that, for a positive dielectric anisotropy liquid crystal, $C_2$ is greater than $C_1$.

When an LCD made from a positive dielectric anisotropy liquid crystal is connected in series with a another capacitor having a capacitance $C_0$ it becomes possible to achieve the seemingly inconsistent goals of increasing the fraction of line voltage V distributed across the display at voltages below the $V_t$ and of reducing the fraction of V distributed across the display at voltages above $V_s$. This is done by selecting $C_0$ such that $$C_1 < C_0 < C_2 \tag{8}$$

When $C_0$ is so selected, at voltages below $V_t$ over half of the line voltage V is distributed across the LCD, while at voltages above $V_s$, the reverse is true. (Refer to equations 4 or 5.) This represents an optimal balance between preserving the sensitivity of the LCD and affording substantial overvoltage protection.

Preferably, $C_0$ is substantially constant under all applied voltages. The construction of the capacitor is not critical. Its dielectric material can be air, oil, paper, vacuum, sulfur hexafluoride, aluminum oxide, ceramic, and so forth.

The advantage of selecting $C_0$ according to inequality (8) can be illustrated by reference to the following specific case. Consider an LCD where $C_1$ is 10 picofarads, $C_2$ is 30 picofarads, $V_t$ is 10 volts, and $V_w$ is 200 volts. Table I shows what happens when this LCD is connected in series with a capacitor having a capacitance $C_0$ of 2, 20, or 60 picofarads, the first and the last capacitances being outside the range indicated by inequality (8).

TABLE I

|  | Capacitance $C_0$ (pF) | | |
| --- | --- | --- | --- |
|  | 2 | 20 | 60 |
| Line voltage at which LCD reaches $V_t$ | 60 | 15 | 11.7 |
| Line voltage at which LCD reaches $V_w$ | 3200 | 500 | 300 |

With the 2 pF capacitor, there is substantial protection against an overvoltage, but the LCD is very insensitive: it will turn on only when the line voltage reaches 60 volts. With the 60 pF capacitor, the LCD is quite sensitive, turning on at a line voltage of 11.7 volts—not much above the normal threshold voltage of 10 volts—but there is minimal overvoltage protection. With the 20 pF capacitor, the LCD is still quite sensitive, turning on at a line voltage of 15 volts, but also enjoys substantial overvoltage protection.

It is also to be noted that, within the range $C_1$–$C_2$ of inequality (8), $C_0$ can be selected so as to fine tune the desired balance between sensitivity and overvoltage protection. The selection of a $C_0$ closer to $C_1$ will emphasize somewhat more overvoltage protection, while the selection of a $C_0$ closer to $C_2$ will emphasize somewhat more device sensitivity.

It is also to be noted that if a particular function is to be primarily emphasized, selection outside of the range of inequality (8) is possible. For example, if overvoltage protection is the primary concern, then $C_0$ should be selected according to $$C_0 < C_2 \tag{9}$$

and can in fact be less than $C_1$.

This invention can be practiced with LCD's made from any liquid crystal having positive dielectric anisotropy. In a preferred embodiment, the LCD is of the type commonly known as "twisted nematic," the preparation and properties of which are reviewed in Bahadur, cited hereinabove. In another preferred embodiment, the LCD is made from encapsulated liquid crystals, which are liquid crystals confined in a containment or encapsulation medium or material. Encapsulated liquid crystals can be made by mixing them and an encapsulating medium in which they will not dissolve and permitting the formation of discrete capsules of liquid crystals in the encapsulating medium. For colored visual effects, a pleochroic dye can be included. A preferred encapsulating medium is polyvinyl alcohol. The preparation of encapsulated liquid crystals and devices therefrom suitable for the practice of the instant invention is described in U.S. Pat. No. 4,435,047 (Fergason) and U.S. Pat. No. 4,591,233 (Fergason), the disclosures of which are herein incorporated by reference.

It is well known in the art that liquid crystals in LCD's need not be discrete or pure compounds, but can be mixtures. For example, liquid crystals can be blended to achieve a particular temperature range of liquid crystallinity or a particular degree of dielectric anisotropy. As used in this specification, the term "liquid crystal" or "liquid crystal material" includes discrete liquid crystal compounds, blends of liquid crystals, and encapsulated liquid crystals.

The practice of this invention is not limited to having the capacitor connected to a single positive dielectric anisotropy LCD. FIG. 3 depicts an embodiment 7 in which a capacitor 8 having capacitance $C_0$ is connected to the first one of twenty-nine positive dielectric anisotropy LCD's 9 connected in series, each LCD having the same capacitances $C_1$ and $C_2$ below $V_t$ and above $V_s$, respectively, and arranged in an array to form the numeral one. (For convenience, not each occurrence of the LCD's 9 is labeled in the figure.)

When several LCD's are used, the device may comprise an array comprising a plurality of liquid crystal elements in which a first liquid crystal element has a capacitance in the non-energized state lower than the capacitance of any other of said liquid crystal elements and comprises a liquid crystal material having a positive dielectric anistropy so that said liquid crystal element has a capacitance in the energized state higher than its capacitance in the non-energized state; and a second liquid crystal element is electrically connected in series with said first liquid crystal element, said second liquid crystal element having a capacitance in the non-energized state lower than the capacitance of the first liquid crystal element in its energized state. Preferably each of the liquid crystal elements has a positive dielectric anisotropy. In such an array, the liquid crystal elements may be substantially the same size or may be of different sizes. The array of this embodiment is disclosed in commonly assigned PCT application PCT/US87/01756 filed concurrently herewith, the disclosure of which is incorporated herein by reference.

Such a construction offers a number of advantages. Although the individual LCD's are relatively small, the overall effect is that of a large display. An individual large LCD is difficult to fabricate and, once fabricated, draws a relatively high current or requires a relatively long time to turn on because of its relatively large leakage current and its relatively large time constant for building up the requisite $V_t$ across the electrodes, respectively. In the construction of FIG. 3, this limitation is avoided. The LCD's are electrically equivalent to n capacitors connected in series (n being 29 in this case), the overall capacitance being $C_1/n$ below the threshold voltage and $C_2/n$ above the saturation voltage. The overall capacitance is much less than the capacitance of the individual LCD's and much, much less than the capacitance of a single LCD of size comparable to the array. As discussed hereinbefore, $C_0$ can be selected to emphasize LCD sensitivity or overvoltage protection. Thus, for sensitivity, it is desirable that $$C_1/n < C_0 \tag{10}$$

while for overvoltage protection, it is desirable that $$C_0 < C_2/n \tag{11}$$

In yet another embodiment of the invention, an analog voltmeter is provided. Referring to FIG. 4, analog voltmeter 10 comprises subunits 11, 12, 13, and 14 connected in parallel to each other. Each subunit in turn comprises at least one LCD 15 connected in series with a capacitor 16. In subunits 12, 13, and 14, which have more than one LCD 15, the latter are connected in series to each other. Each LCD 15 is made from a liquid crystal having positive dielectric anisotropy. For convenience of illustration, each LCD 15 has the same capacitance $C_1$ below the threshold voltage $V_t$ and the same capacitance $C_2$ above the saturation voltage $V_s$ and each of the capacitors 16 has the same capacitance $C_0$. When voltmeter 10 is connected across a voltage V it provides an analog readout of V. It is known that for n capacitors of equal capacitance connected in series, an overall voltage is distributed equally amongst them, each bearing 1/nth of the total. Thus, all the LCD's 15 in a given subunit will turn on at a line voltage V given by equation (12):

$$V = nV_t + V_0 \tag{12}$$

where n is the number LCD's 15 in that subunit and $V_0$ is the voltage distributed across the capacitor 16. When the voltage across each LCD 15 is $V_t$, equation (13) holds:

$$V_0 C_0 = C_1 V_t \tag{13}$$

Combining equations (12) and (13), we have $$V = V_t(n + C_1/C_0) \tag{14}$$

Thus, if, for example, $V_t$ is 10 volts and subunit 11 turns on at V=15 volts, then subunits 12, 13, and 14 will turn on at V=25, 35, and 45 volts, respectively. Optionally, the viewing area of the voltmeter 10 can be masked as indicated by dotted box 17, so that only the LCD's within it are visible, thereby giving the effect of a single-bar readout. Those skilled in the art will realize that other constructions and combinations besides the one specifically shown in FIG. 4 are possible. For example, if desired, the increase in the number of subunits n in going from subunits 11 through 14 need not be the arithmetic progression depicted, but can be a geometric or other progression. Alternatively, the capacitances $C_1$, $C_2$, and $C_0$ need not be the same for each LCD or capacitor.

In yet another embodiment of the invention, an LCD is protected from a surge in the line voltage. In this embodiment, the normal line voltage is less than the withstand voltage of the LCD, but is susceptible to surges which can take it above the withstand voltage. An LCD having capacitances $C_1$ and $C_2$ as hereinbefore defined is connected in series to a capacitor and a means for applying a voltage less than $V_w$ across the combination of the LCD and the capacitor. Preferably the capacitor has a fixed capacitance $C_0$. $C_0$ is preferably less than $C_2$ and, more preferably, greater than $C_1$ but less than $C_2$.

LCD's suitable for the practice of this invention advantageously have a laminar construction using an encapsulated liquid crystal. FIG. 5 depicts in cross section such a laminate 18. The laminate comprises two transparent supporting materials 19 and 20, having opposing electrodes 21 and 22 deposited on their respective inside surfaces. Encapsulated liquid crystal 23 is between the support materials 19 and 20 and the electrodes 21 and 22, forming an LCD 24. The boundaries of LCD 24 are defined by the overlap of electrodes 21 and 22. Lines 25-25' and 26-26' are drawn in to facilitate visualization of these boundaries.

This laminated construction is particularly advantageous for the preparation of an array of LCD's connected in series, such as that of FIG. 3. FIG. 6 shows in cross section such a construction 27. Two support materials 28 and 29 have deposited on their inner surfaces electrodes 30a-d. Encapsulated liquid crystal material 31 is between the support materials 28 and 29 and the electrodes 30a-d, forming LCD's 32a-c. The overlap of electrodes 30a and 30b defines LCD 32a, the overlap of electrodes 30b and 30c defines LCD 32b, and the overlap of electrodes 30c and 30d defines LCD 32c. Lines 33-33', 34-34', 35-35', 36-36', 37-37', and 38-38' are drawn in to facilitate visualization of LCD's 32a-c. Because of this serial overlap of the electrodes, the LCD's 32a-c are connected in series, the non-overlapping portion of each electrode forming the electrical connection between adjacent LCD's. For example, the portion of electrode 30b not overlapping either electrode 30a or 30c connects LCD's 32a and 32b. Thus, LCD 32a is connected in series to LCD 32b, which in turn is connected in series to LCD 32c.

An LCD having a laminar construction is readily prepared as follows. A drawing is made of the desired electrode patterns. Using a conventional photoresist technique, each drawing is transferred onto a sheet of transparent support material, for example poly(ethylene terephthalate) (Mylar) or polyamide, which has been coated on one side with an electrode material, for example indium tin oxide (ITO). The excess and undesirable ITO is removed, leaving on each sheet of support material a pattern of ITO electrodes. One of the sheets was is coated, for example by a knife-coating technique, on the conductor side with liquid crystal material, for example E63 from British Drug House or Merck 1840, mixed with an encapsulating medium, preferably polyvinyl alcohol. The tacky layer of liquid crystal-encapsulating medium mixture is cured. The other sheet is placed over the encapsulated liquid crystal layer, conductor side facing the liquid crystal material and taking care to ensure that the conductor patterns are properly registered. The sheets are then laminated by heating in an oven, to produce a laminated construction having a number of LCD's connected in series.

The following example of the invention is provided by way of illustration, not limitation.

EXAMPLE

High-impedance, encapsulated liquid crystal was prepared by mixing 2 g of biphenyl-containing nematic liquid crystal (E63 from British Drug House, a subsidiary of E. Merck of West Germany) with 4 g of a 22% solution in water of poly(vinyl alcohol) (Vinol 203, from Air Products Corp., purified as described below). The mixture was emulsified in a small homogenizer at low shear.

The emulsion was coated on a polyester film (Mylar) having an ITO (Intrex) electrode film thereon, with a doctor blade at a 3 mil setting. The emulsion was then air-dried at room temperature. A second polyester film, also having an ITO electrode, was placed against the emulsion side of the first polyester film, taking care to properly register the electrodes. The polyester films were laminated to each other by passing the sandwich between hot rollers (ca. 90° C.) and the heating in an oven at about 90° C. for 3-4 hrs. The thickness of the encapsulated liquid crystal layer was about 10 microns. The nematic liquid crystal particles were about 3 to 4 microns in diameter.

An LCD having a cross-sectional area of approximately 1 square cm was prepared from the laminate. It scattered light in a zero-field or field-off condition. It had a threshold voltage of about 7 volts and a saturation voltage of about 35 volts. Its resistivity was $3 \times 10^{12}$ ohm-cm, based on a dielectric constant of 12 and using ballistic measurements of decay time. The LCD had a capacitance of about 1000 pF at 1 volt (a voltage below the threshold voltage) and a capacitance of about 2000 pF at 40 volts (a voltage above the saturation voltage).

The LCD was connected in series with a 1500 pF capacitor. In this combination, the LCD had an effective threshold voltage of about 10 volts and an effective saturation voltage of about 100 volts.

The poly(vinyl alcohol) was purified by washing 200 g of it with 500 mL of methanol, and then dissolving it in 500 mL of deionized water. It was precipitated from solution by adding 500 mL of methanol, and then dried.

We claim:

1. An electrical apparatus comprising
   (a) a liquid crystal display comprising a positive dielectric anisotropy liquid crystal and having a capacitance $C_1$ below its threshold voltage and a capacitance $C_2$ above its saturation voltage and
   (b) a capacitor connected in series with said display and having a substantially constant capacitance $C_0$ satisfying the inequality $$C_0 < C_2.$$

2. An apparatus according to claim 1 wherein $$C_1 < C_0 < C_2.$$

3. An apparatus according to claim 1 or 2 wherein said positive dielectric anisotropy liquid crystal is encapsulated nematic liquid crystal.

4. An electrical apparatus comprising
   (a) a series-connected array of liquid crystal displays, each of said displays comprising a positive dielectric anisotropy liquid crystal and each of said displays having a capacitance $C_1$ below its threshold voltage and a capacitance $C_2$ above its saturation voltage, and
   (b) a capacitor connected in series with a display at a terminus of said array and having a substantially constant capacitance $C_0$ satisfying the inequality $$C_0 < C_2/n,$$

where n is the number of displays in said array.

5. An apparatus according to claim 4, wherein said positive dielectric anisotropy liquid crystal is encapsulated nematic liquid crystal.

6. An electrical circuit comprising:
   (a) a liquid crystal display comprising a positive dielectric anisotropy liquid crystal and having a capacitance $C_1$ below its threshold voltage and a capacitance $C_2$ above its threshold voltage;
   (b) a capacitor in series with said display, said capacitor having a substantially constant capacitance less than $C_2$; and
   (c) a means for applying a voltage less than the withstand voltage of said display across the combination of said display and said capacitor.

7. A circuit in accordance with claim 6 wherein said substantially constant capacitance is between $C_1$ and $C_2$.

8. A circuit in accordance with claim 6, further comprising at least one additional liquid crystal display.

9. A circuit in accordance with claim 8, wherein said at least one additional liquid crystal display is connected in series with said liquid crystal display.

10. A circuit in accordance with claim 6 wherein said means comprises a power supply having an output voltage less than the withstand voltage of said display.

11. A circuit in accordance with claim 6 wherein said means comprises (i) a power supply having an output voltage greater than the withstand voltage of said display and (ii) a voltage reduction means.

12. A circuit in accordance with claim 11 wherein said voltage reduction means comprises a capacitor connected in series with said power supply.

* * * * *

UNITED STATES PATENT AND TRADEMARK OFFICE
CERTIFICATE OF CORRECTION

PATENT NO. : 5,016,982
DATED : May 21, 1991
INVENTOR(S) : Fergason et al.

It is certified that error appears in the above-indentified patent and that said Letters Patent is hereby corrected as shown below:

Column 1, line 8, after "176,522" insert--filed April 1, 1988--.

Column 3, lines 26 to 27, replace "300 volt-s" by--300 volts--.

Column 7, line 45, replace "subnits by--subunits--.

Column 9, line 10, delete "was".

Column 9, line 45, replace "and the" by--and then--.

Claim 6, line 5, (column 10, line 42) replace "threshold" by--saturation--.

Signed and Sealed this

Seventh Day of June, 1994

Attest:

BRUCE LEHMAN

*Attesting Officer*   *Commissioner of Patents and Trademarks*